Aug. 27, 1940.                P. ADORJAN                2,213,099
           DISTORTION INDICATOR FOR ELECTRICAL AMPLIFYING SYSTEMS
                          Filed Dec. 9, 1936
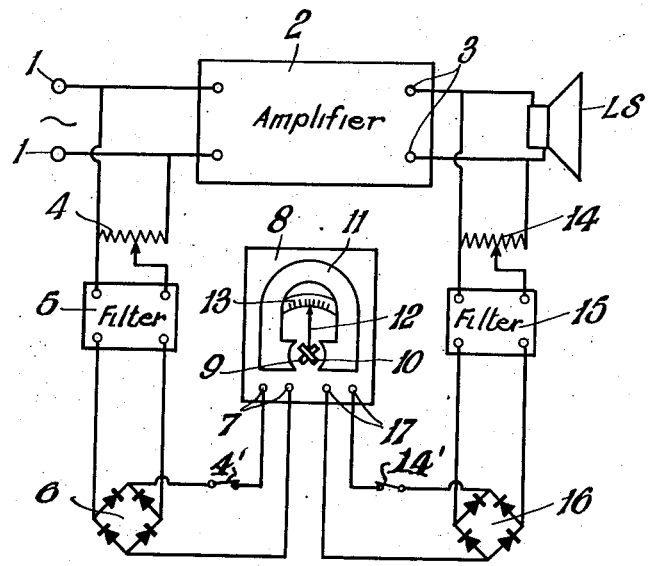
Inventor:
Paul Adorjan,
By Potter, Pierce & Scheffler,
Attorneys Patented Aug. 27, 1940

2,213,099

UNITED STATES PATENT OFFICE 2,213,099

DISTORTION INDICATOR FOR ELECTRICAL AMPLIFYING SYSTEMS

Paul Adorjan, London, England, assignor to Rediffusion Limited, London, England

Application December 9, 1936, Serial No. 115,059
In Great Britain December 11, 1935

6 Claims. (Cl. 171—95)

This invention relates to distortion indicators for electrical amplifying systems, particularly thermionic amplifying systems of the types employed for the transmission of radio and audio frequency signals, and the invention has for its object to provide an indicator which indicates continuously whether or not an electrical amplifier is giving rise to distortion, and which may be used continuously without appreciably affecting the operation of the amplifier.

If an amplifier is operating and is producing no distortion, the output waveform is an exact replica of that of the signal input voltage and the ratio of the instantaneous voltages is constant at a figure which represents the gain of the amplifier. If distortion occurs the output waveform differs from that of the input and the ratio of the instantaneous voltages varies from point to point of the cycle.

According to the present invention I provide a distortion indicator for an electrical amplifier comprising means responsive to input voltage, means responsive to output voltage, and means responsive to variation in ratio of said voltages.

In the accompanying drawing is shown by way of example one embodiment of the invention. The invention is not however limited to such application and may be modified within the scope of the appended claims. In this drawing is shown a harmonic distortion indicator as applied to a thermionic amplifier.

In this drawing voltages to be amplified are applied to terminals 1 of a thermionic amplifier 2 the output terminals 3 of which feed a loudspeaker or other load circuit LS. A fraction of the input voltage is obtained by means of an attenuator 4 which, after passing through a filter or equalising network 5, is applied to a rectifying circuit preferably of the bridge type indicated at 6. The uni-directional output of the rectifier 6 is then applied to the terminals 7 of an instrument 8 comprising two wound moving coils 9 and 10 which are rigidly secured together at right angles and disposed in a magnetic field produced by a permanent magnet 11. A pointer 12 and scale 13 are provided for indicating deflection of the assembly comprising coils 9 and 10.

The output terminals 3 of the amplifier 2 are provided with attenuator 14, equalising network 15, and rectifier 16 similar to those associated with the input terminals 1. The output of the rectifier 16 is applied to terminals 17 of the instrument 8.

The terminals 7 and 17 feed respectively the coils 9 and 10 and by virtue of their arrangement, these coils will be deflected and will indicate upon the scale 13 a quantity which is the ratio of the unidirectional currents passing through them. By suitable adjustment of the attenuators 4 and 14 the currents in the coils 9 and 10 may be adjusted so that the torque-producing effects of the two currents exactly balance each other, that is with the amplifier in operation the pointer does not move from its zero position which, in this type of instrument, is between the ends of the graduated scale. Provided that the ratio of the output to input voltages remains the same, the ratio of the rectified voltages will be unaltered and no deflection of the pointer 12 will occur. If, however, there should be a change of ratio of output to input voltages, then there will be a deflection of the pointer 12 from its zero position and this deflection indicates the amount of distortion being produced by the amplifier.

In general, the distortion produced by an amplifier is negligible when the output power is very much below that which the amplifier is capable of producing, and the adjustment of the two voltages to equality is therefor carried out at a low output level. The adjustment may be checked by measurements. When there is no distortion the rectified voltages applied to the two coils of the instrument are equal but opposite in polarity and no movement of the coils takes place. With increasing output and hence increasing distortions of the amplifier the R. M. S. value of the portion of the output voltage fed to the instrument differs from the R. M. S. value of the portion of the input voltage fed to the instrument and the movement of the coils will be proportional to the ratio of the two voltages. The pointer attached to the moving coils will indicate this ratio for the various output values and the scale may be calibrated directly in percentage total harmonics.

When such an arrangement is used in connection with an amplifier with negligible frequency discrimination a satisfactory indication of harmonic distortion can be obtained for any single frequency or complex wave form input, provided that such input is within the frequency range of the amplifier. When the frequency discrimination of the amplifier is not negligible, that is, the gain of the amplifier at different frequencies varies, the equalising network 15 is given a characteristic which is the inverse of the frequency characteristic of the amplifier.

It is nearly always found that the harmonic distortion produced by an amplifier varies with the input frequency and in such cases an indicating device as described may be misleading as different amounts of distortion will be indicated when low frequencies or high frequencies are applied to the input. To avoid this, the action of the distortion indicating device may be limited to a narrow band of frequencies by the insertion of the networks 5 and 15.

The instrument described herein can also be combined for the indication of either output or input levels by disconnecting the input or output of the amplifier from the instrument when only one coil of the instrument will work and give a measure of the output or input voltage respectively. The attenuators 4, 14 provide means for reducing the transmission along either branch of the measuring circuit to zero but separate switching means 4', 14' for this purpose may be provided in the input and output branches, respectively, of the measuring circuit.

What I claim and desire to secure by Letters Patent is:

1. In a distortion indicator for a thermionic voltage amplifying system having input and output terminals, the combination with an indicating instrument including a pair of coils for jointly controlling the position of a pointer with respect to a scale having a zero graduation, of a transmission network for connecting one coil to the input terminals of the amplifier, a transmission network for connecting the other coil to the output terminals of the amplifier, and means included in one of said networks for adjusting the ratio of transmissions of said networks to set the instrument pointer at the zero graduation of the scale during operation of the amplifier at a finite distortion-free gain, whereby deflection of the pointer from said zero graduation constitutes an indication of distortion in the transmission of said amplifier.

2. A distortion indicator for a signal voltage amplifying system, comprising an amplifier of the thermionic type that develops harmonics of the input signal frequencies when overloaded, an input circuit and an output circuit for said amplifier, a pair of crossed moving coils rigidly connected together, means for rectifying a voltage derived from said input circuit, means for rectifying a voltage derived from said output circuit, means for impressing the rectified voltages from said rectifiers upon the said moving coils, a pointer indicating the deflection of said coils, a graduated scale over which said pointer is movable, and means for adjusting the relative magnitudes of the rectified voltages to set the pointer at a scale graduation corresponding to distortion-free amplification during distortion-free operation of said amplifier at any value of the gain thereof.

3. A distortion indicator for a signal voltage amplifying system comprising an amplifier of the thermionic type that develops harmonics of the input signal frequencies when overloaded, an input circuit and an output circuit for said amplifier, means for rectifying a voltage derived from said input circuit, variable attenuator means between said input circuit and said rectifier, means for rectifying a voltage derived from said output circuit, a second attenuator means between said output circuit and said last-mentioned rectifier means, a pair of crossed moving coils rigidly connected together, means for impressing the rectified voltages from said rectifiers upon the said moving coils, and means for indicating the deflection of said coils, whereby deflection of the coils from a zero position corresponding to a linear transmission through the amplifier indicates the presence of harmonic components in the output circuit of the amplifier.

4. A device as claimed in claim 2 and comprising a filter network between said output circuit and said rectifier.

5. A device as claimed in claim 2 and comprising similar filter networks between said input circuit and said associated rectifier and said output circuit and said associated rectifier.

6. The method of obtaining a continuous indication of the distortion characteristic of a thermionic amplifying system which comprises withdrawing continuously from the amplifying system two voltages that vary respectively with the magnitudes of the input and output voltages of the system during the normal operation thereof, adjusting the magnitudes of said derived voltages to a predetermined ratio during distortion-free operation of said amplifying system, and indicating the presence and magnitude of amplifier distortion during normal operation in terms of the departure of said ratio of magnitudes from its predetermined value.

PAUL ADORJAN.